(12) United States Patent
Naveen et al.

(10) Patent No.: US 9,335,915 B2
(45) Date of Patent: May 10, 2016

(54) SINGLE CUSTOM CONTROL TO SET VARIOUS WAVEFORM PARAMETERS FOR GENERATING WAVEFORMS IN AWG

(71) Applicant: Tektronix, Inc., Beaverton, OR (US)

(72) Inventors: Kavitha Naveen, Bangalore (IN); M. S. Sherina, Bangalore (IN)

(73) Assignee: Tektronix, Inc., Beaverton, OR (US)

( * ) Notice: Subject to any disclaimer, the term of this patent is extended or adjusted under 35 U.S.C. 154(b) by 202 days.

(21) Appl. No.: 14/254,522

(22) Filed: Apr. 16, 2014

(65) Prior Publication Data

US 2014/0325421 A1 Oct. 30, 2014

(30) Foreign Application Priority Data

Apr. 26, 2013 (IN) .......... 1543/MUM/2013

(51) Int. Cl.
*G06F 3/048* (2013.01)
*G06F 3/0485* (2013.01)
*G06F 3/0488* (2013.01)
*G06F 1/02* (2006.01)

(52) U.S. Cl.
CPC .......... *G06F 3/0485* (2013.01); *G06F 3/04883* (2013.01); *G06F 1/022* (2013.01)

(58) Field of Classification Search
CPC ..................................................... G06F 1/022
USPC ........................................................ 715/771
See application file for complete search history.

(56) References Cited

U.S. PATENT DOCUMENTS

| | | | |
|---|---|---|---|
| 6,229,536 B1 * | 5/2001 | Alexander | G01R 13/345 345/440 |
| 6,707,474 B1 * | 3/2004 | Beck | G01R 1/025 702/66 |
| 7,062,716 B2 * | 6/2006 | Washington | G06F 8/34 715/763 |
| 7,366,993 B2 * | 4/2008 | Joffrain | G06F 3/0486 345/440 |
| 2001/0035879 A1 * | 11/2001 | Washington | G06F 8/34 715/763 |
| 2002/0196282 A1 * | 12/2002 | Washington | G06F 8/34 715/763 |
| 2002/0196283 A1 * | 12/2002 | Petruk | G06F 8/34 715/763 |
| 2003/0085925 A1 * | 5/2003 | Bernard | G01R 13/029 715/764 |
| 2004/0239697 A1 * | 12/2004 | Cake | G01R 13/029 715/700 |
| 2006/0143570 A1 * | 6/2006 | Washington | G06F 8/34 715/763 |
| 2006/0259871 A1 * | 11/2006 | Washington | G06F 8/34 715/763 |

FOREIGN PATENT DOCUMENTS

| | | |
|---|---|---|
| EP | 1205837 A2 | 5/2002 |
| WO | 2007149357 A2 | 12/2007 |

OTHER PUBLICATIONS

Agilent Technologies, "Agilent Arbitrary Waveform Generator 81180A User's Guide," retrieved on Jun. 30, 2014 from http://cp.literature.agilent.com/litweb/pdf/81180-9120.pdf, 350 pages.
European Search Report, for Application No. 14165979.7, dated Jul. 7, 2014, 11 pages.

* cited by examiner

*Primary Examiner* — William Titcomb
(74) *Attorney, Agent, or Firm* — Marger Johnson

(57) ABSTRACT

An aspect of the invention includes a computer with a processor and a memory. The processor can generate a control for an Arbitrary Waveform Generator. The control includes various buttons, a drop-down list, and a text box. Upon selection of a button, the control is automatically updated to update the drop-down list and the text box as appropriate. The control is presented on a single screen.

15 Claims, 5 Drawing Sheets

SINGLE CUSTOM CONTROL TO SET VARIOUS WAVEFORM PARAMETERS FOR GENERATING WAVEFORMS IN AWG

FIELD OF THE INVENTION

This disclosure pertains to waveform generation, and more particularly to a control for waveform generation that presents all controls in a single screen.

BACKGROUND

Currently, user interfaces can get very complicated. Some user interfaces require a user to flip through multiple different screens or dialog boxes to adjust all the settings offered by the control. The more advanced the user interface, the more screens or dialog boxes can be required to let the user access all the features of the control.

Tektronix's Arbitrary Waveform Generators offer a good example. Current user interfaces to access and use the Arbitrary Waveform Generator employ multiple screens and dialog boxes to give the user access to every feature of the Generator. But by using many different screens and/or dialog boxes, it can be difficult for the user to find and change a specific parameter.

A need remains for a way to address these and other problems associated with the prior art.

SUMMARY OF THE INVENTION

Aspects of the invention include a control for a device, such as an Arbitrary Waveform Generator. The control includes various buttons, a drop-down list, and a text box. When the user selects one of the buttons on the control, the drop-down list is populated with parameters appropriate to that button, and the text box can be used to enter or adjust values for that parameter. In this manner, the control can be used in a single screen.

DETAILED DESCRIPTION

Figure 1:
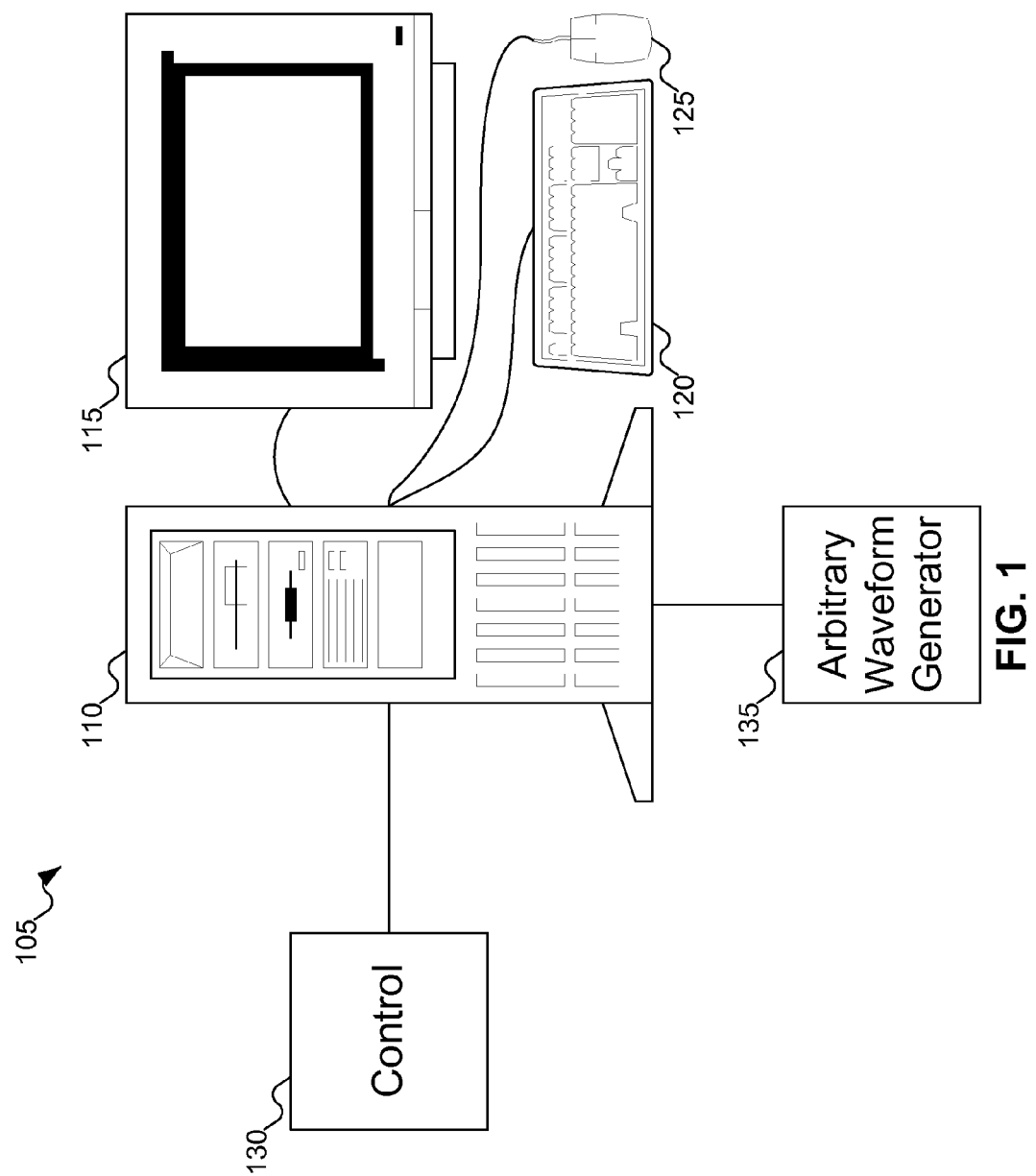
FIG. 1 shows a computer system to use a control for an Arbitrary Waveform Generator with a single screen, according to an embodiment of the invention.

FIG. 1 shows a computer system to use a control (i.e., user interface) for an Arbitrary Waveform Generator (AWG) with a single screen, according to an embodiment of the invention. In FIG. 1, computer system 105 is shown as including computer 110, monitor 115, keyboard 120, and mouse 125. A person skilled in the art will recognize that other components can be included with computer system 105: for example, other input/output devices, such as a printer. In addition, FIG. 1 computer system 105 can include conventional internal components not shown in FIG. 1: for example, central processing unit, memory, storage, etc. In addition, although not shown in FIG. 1, a person skilled in the art will recognize that computer system 105 can interact with other computer systems, either directly or over a network (not shown) of any type. Finally, although FIG. 1 shows computer system 105 as a conventional desktop computer, a person skilled in the art will recognize that computer system 105 can be any type of machine or computing device capable of providing the services attributed herein to computer system 105, including, for example, a laptop computer, a personal digital assistant (PDA), or a cellular telephone.

Computer 110 includes control 130 and Arbitrary Waveform Generator 135. Control 130 provides the user with a way to configure and use Arbitrary Waveform Generator 135. Control 130 is discussed further with reference to FIG. 4, below.

Figure 2:
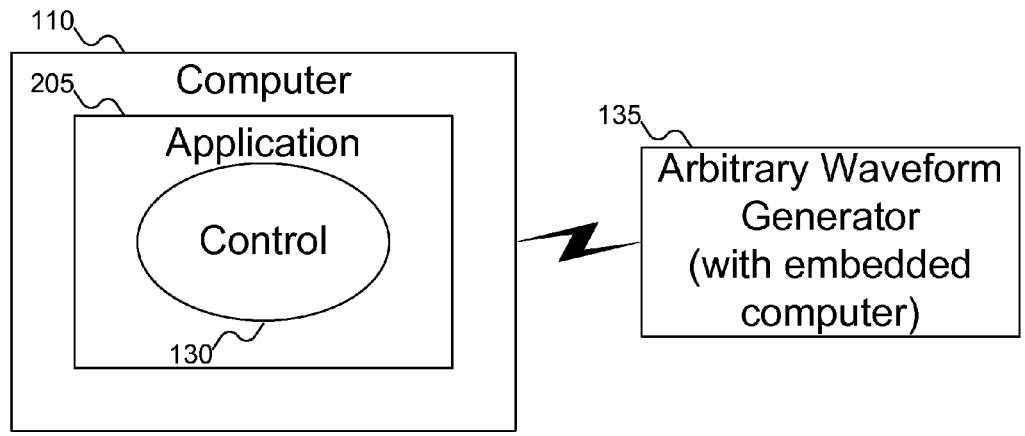
FIG. 2 shows the control of FIG. 1 used in offline mode.

FIG. 1 shows control 130 as part of computer 110 that is separate from Arbitrary Waveform Generator 135. FIG. 2 shows such an embodiment of the invention in a high level block diagram, called offline mode. Computer 110 includes application 205, which includes control 130. A user can use control 130 within application 205 to generate the instructions for Arbitrary Waveform Generator 135. These instructions can then be sent to Arbitrary Waveform Generator 135 to generate a waveform. Arbitrary Waveform Generator 135 can be directly connected to computer 110, or it can be connected to computer 110 via a network (not shown in FIG. 1). In fact, Arbitrary Waveform Generator 135 can be remotely located relative to computer 110. Any network interface between computer 110 and Arbitrary Waveform Generator 135 can be used.

Figure 3:
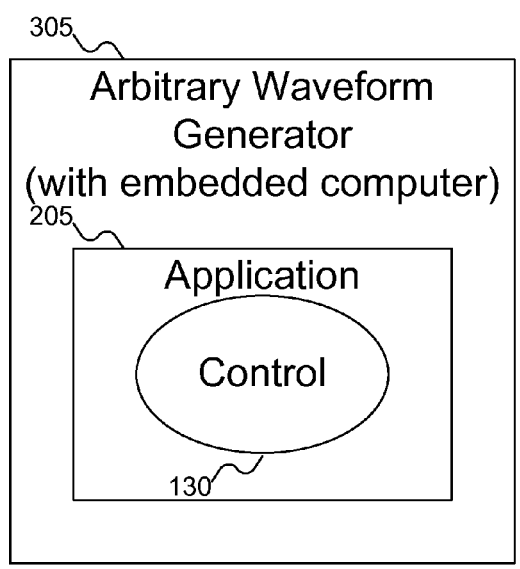
FIG. 3 shows the control of FIG. 1 used in online mode.

In contrast with offline mode, FIG. 3 shows an embodiment of the invention called online mode. In FIG. 3, control 130 and application 205 are part of Arbitrary Waveform Generator 135. In such an embodiment of the invention, Arbitrary Waveform Generator 135 can act as a special purpose computer, complete with hardware and/or software to support the use of control 130. The instructions generated by the use of control 130 in application 205 do not need to be sent via a network interface to Arbitrary Waveform Generator 135, as control 130 and application 205 are part of Arbitrary Waveform Generator.

Regardless of whether the system is operating in online mode (FIG. 3) or offline mode (FIG. 2), the use of control 130, as discussed below, is the same.

Figure 4:
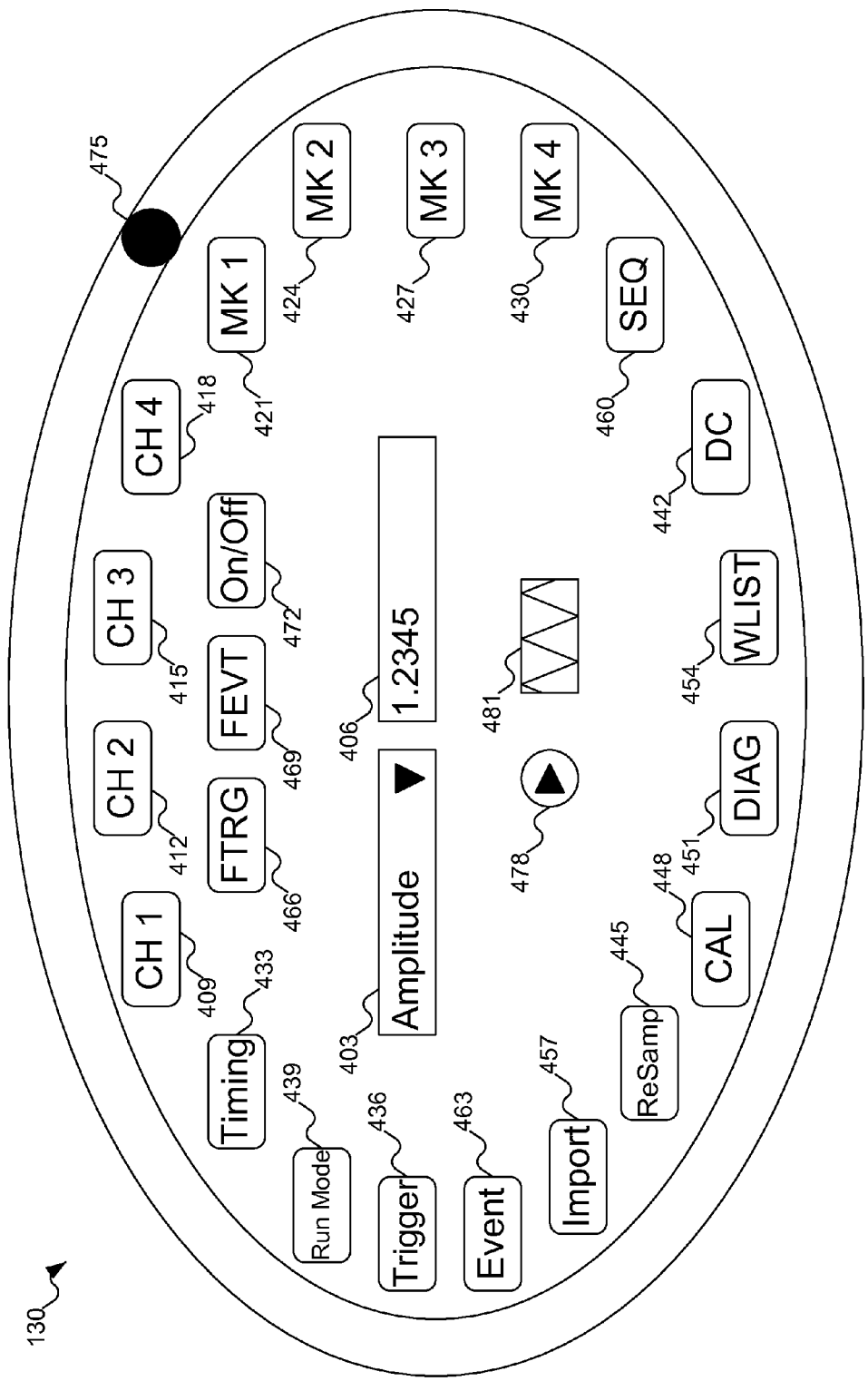
FIG. 4 shows the control of FIG. 1.

FIG. 4 shows the control of FIG. 1. In FIG. 1, control 130 includes various buttons, drop-down list 403, and text box 406. As the various buttons are selected by the user, drop-down list 403 and text box 406 are modified to let the user set or change the values for parameters associated with the buttons.

Various parameters can have limits (minimums, maximums, or both). If limits exist for a particular parameter, the values input into text 406 can be compared against the limits to ensure the values are acceptable. If the values are not outside the limits appropriate for the parameter, the text box can be updated to the appropriate limit. For example, if the user enters a value that is below the minimum value for the parameter, the text box can be updated to reflect the minimum value automatically. Or if the user enters a value that is greater than the maximum value for the parameter, the text box can be updated to reflect the maximum value automatically. The user can also be informed that a value is not acceptable in other ways: for example, by changing the color of the text box and/or displaying a message to the user that the value is not acceptable.

Channel Buttons

Control 130 includes four channel buttons 409, 412, 415, 418. The parameters for each channel button 409, 412, 415, 418 include Output State, Interleave State, Amplitude, Offset, Filter, DAC Resolution (in bits), and Waveform Rotation. The user can then select one of these parameters and enter the appropriate value for the selected parameter.

Figure 5:
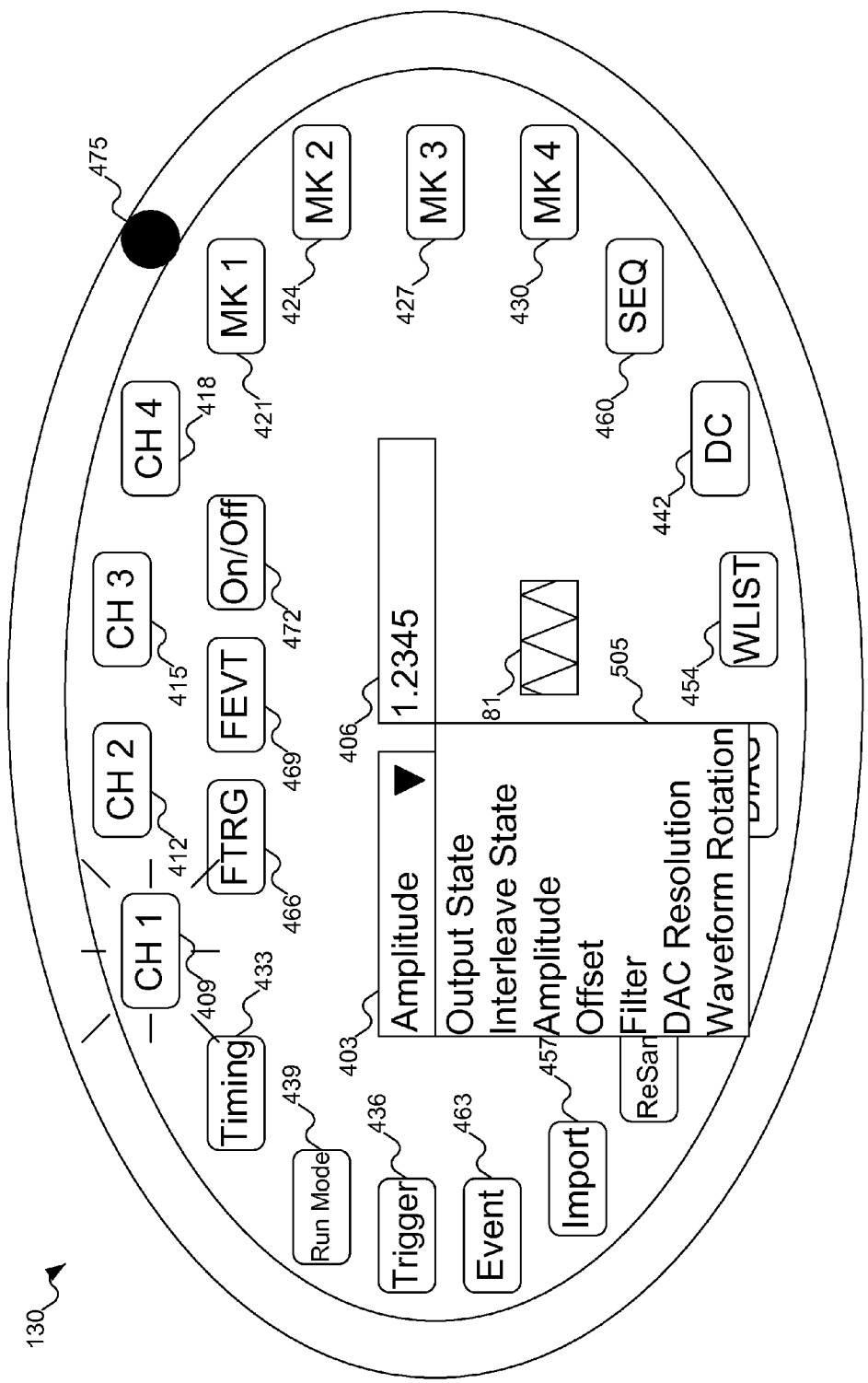
FIG. 5 shows the control of FIG. 4 with the drop-down list showing parameters for a channel button.

FIG. 5 shows the control of FIG. 4 with the drop-down list showing parameters for a channel button. In FIG. 5, channel button 409 is selected. Drop-down list 403 is shown with list 505, from which the user can select a parameter, after which the user can enter a value for the selected parameter in text box 406.

Because the operation of drop-down list 403 and text box 406 is similar for all other buttons (although the actual parameters can vary), the parameters for particular buttons are described, but not shown in other drawings.

Channel Marker Buttons

Returning to FIG. 4, control 130 includes four channel marker buttons 421, 424, 427, 430. The parameters for each channel marker button 421, 424, 427, 430 include Marker High, Marker Low, Marker Delay, Marker Amplitude, and Marker Offset. The user can then select one of these parameters and enter the appropriate value for the selected parameter.

Timing Button

Control 130 includes timing button 433. The parameters for timing button 433 include Sampling Rate, Repetition Rate, Clock Source, External Divider Rate, Reference Source, External Multiplier Rate, and External Reference. The user can then select one of these parameters and enter the appropriate value for the selected parameter.

Trigger Button

Control 130 includes trigger button 436. The parameters for trigger button 436 include Source, Interval, Level, Polarity, and Impedance. The user can then select one of these parameters and enter the appropriate value for the selected parameter.

Run Mode Button

Control 130 includes run mode button 439. The parameters for run mode button 439 include Continuous, Triggered, Gated, and Sequence. The user can then select one of these parameters and enter the appropriate value for the selected parameter.

DC Button

Control 130 includes DC button 442. The parameters for DC button 442 include DC1, DC2, DC3, DC4, and DC Output. The user can then select one of these parameters and enter the appropriate value for the selected parameter.

Resampling Button

Control 130 includes resampling button 445. The parameters for resampling button 445 include Length and Ratio. The user can then select one of these parameters and enter the appropriate value for the selected parameter.

Calibration Button

Control 130 includes calibration button 448. The parameters for calibration button 448 include Analog Channel 1, Analog Channel 2, Analog Channel 3, Analog Channel 4, Marker Channel 1, Marker Channel 2, Marker Channel 3, and Marker Channel 4. The user can then select one of these parameters, and text box 406 displays the pass/fail status of the selected channel's calibration.

Diagnostics Button

Control 130 includes diagnostics button 451. The parameters for diagnostics button 451 include Front Panel, AWG, Clock, Output 1, Output 2, and Output 3. The user can then select one of these parameters, and text box 406 displays the pass/fail status of the selected channel's diagnostics.

Waveform List Button

Control 130 includes waveform list button 454. The parameters for waveform list button 454 include Channel 1, Channel 2, Channel 3, and Channel 4. The user can then select one of these channels, after which text box 406 can display a list of all predefined and user-defined waveforms in the AWG instrument. The user can select one of these waveforms to be assigned to the selected channel.

Import Button

Control 130 includes import button 457. The parameters for import button 457 include AWG (*.awg, *.pat, *.seq *.wfm), Scope (*.wfm), RSA, and Others. The user can then select one of these parameters. Text box 406 can include a browse button to enable the user to browse for files of the selected file type, and select one for import. The selected file can then be shown in text box 406.

For .TXT file format (which the user can select using the Others parameter), the user can be prompted, as part of the browse box, for the format of the file (for example, Analog, Digital 8 bits and Digital 10 bits) and for a Normalize option. For AWG, Scope, and RSA file formats, the waveform can be imported directly, without needing to specify the format of the file or Normalize options.

Waveform Sequence Control Button

Control 130 includes waveform sequence control button 460. The parameters for waveform sequence control button 460 include Wait Trigger, Repeat Count, Event Jump To, Go To Index, and Waveform. The user can then select one of these parameters and enter the appropriate value for the selected parameter.

If the user selects the Wait Trigger parameter, text box 406 displays the element index and trigger state. Text box 406 then enables the user to enter the trigger state and the Element index in the sequence.

If the user selects the Repeat Count parameter, text box 406 displays the element index and repeat count. Text box 406 then enables the user to enter the Repeat value and the Element index in the sequence.

If the user selects the Event Jump To parameter, text box 406 displays the element index and jump index number. Text box 406 then enables the user to enter the jump index and the Element index in the sequence.

If the user selects the Go To Index parameter, text box 406 displays the element index and Go To index number. Text box 406 then enables the user to enter the Go To index and the Element index in the sequence.

Event Button

Control 130 includes event 463 button 442. The parameters for DC button 442 include Level, Polarity, Jump Timing, and Event Impedance. The user can then select one of these parameters and enter the appropriate value for the selected parameter.

Force Trigger Button

Control 130 includes force trigger button 466. Trigger parameters control the signal outputs of the AWG instrument. A trigger controls the waveform output when the Run Mode is Triggered, Gated or Sequence. The user can generate a trigger signal through Force Trigger button 466. The AWG then uses the trigger signal that is generated internally or an external trigger that is applied to the front-panel Trigger Input connector.

Force Event Button

Control 130 includes force event button 469. When a Forced Event occurs, the AWG generates an internal event signal. This signal is used to generate the event when the sequence is waiting for an event jump.

All Outputs On/Off Button

Control 130 includes all outputs on/off button 472. In the AWG instrument, if one or more outputs are on, all outputs are turned off when All Outputs On/Off button 472 is pressed. If all outputs are off, all outputs are turned on when All Outputs On/Off button 472 is pressed.

Dot Button

Control 130 includes dot 475. Dot 475 is a moveable button that can be used like a knob, to scroll through parameters in drop-down list 466, and/or to change scroll through values in text box 406. Dot 475 can be moved along the outer edge of control 130 to change the identified value.

Play Button

Control 130 includes play button 478. Play button 478, when pressed, activates the AWG to generate a waveform.

Waveform Graphic Icon

Control 130 includes waveform graphic icon 481. Waveform graphic icon 481 indicates when the AWG is generating a waveform. Waveform graphic icon 481 can also be animated: the motion of animated waveform graphic icon 481 can then be distinguished from a static waveform graphic icon, which would indicate that the AWG is not currently generating a waveform.

Although control 130 can be used to instruct the Arbitrary Waveform Generator to produce a waveform by setting the various parameters, control 130 can also be used to generate an application. The application generated by control 130 can be thought of as special purpose software. The application can then be used to generate a specific waveform: each time the application is used, the application can drive the Arbitrary Waveform Generator to produce the specific waveform and play it out of the Arbitrary Waveform Generator.

Figure 6:
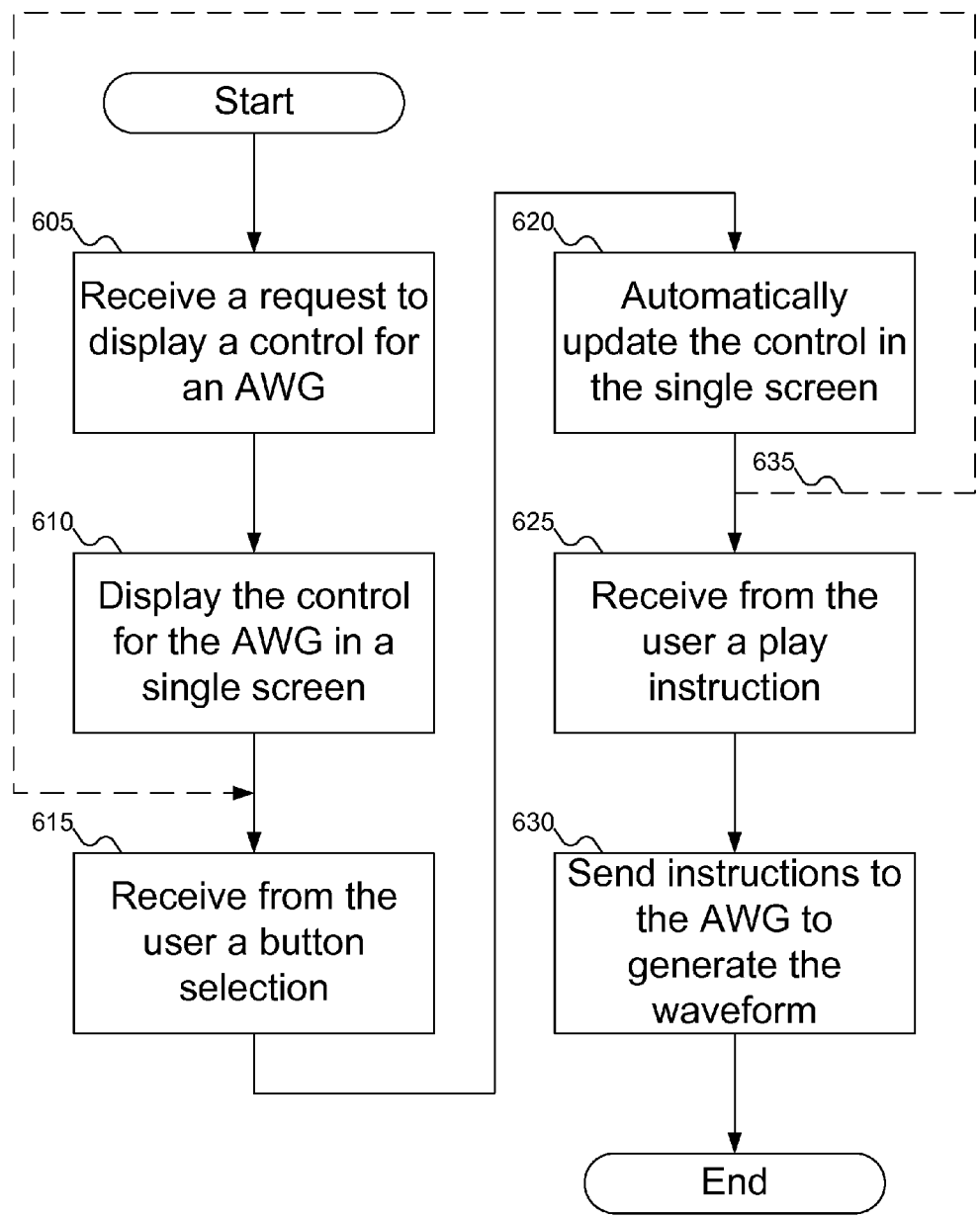
FIG. 6 shows a flowchart of a procedure to use the control of FIG. 1 in a single screen, according to an embodiment of the invention.

FIG. 6 shows a flowchart of a procedure to use the control of FIG. 1 in a single screen, according to an embodiment of the invention. In FIG. 6, at block 605, the system receives a request to display a control for an AWG. At block 610, the system displays the AWG control to the user. At block 615, the system receives a button selection from the user. At block 620, the system automatically updates the control to reflect the appropriate parameters and/or values in the drop-down list and text box, so that the user can set or change parameters appropriate for the selected button. At block 625, the system receives an instruction from the user to generate the waveform. At block 630, the system sends instructions to the AWG to generate the waveform.

The system is not limited to receiving only one button selection from the user, with only one corresponding update of the control. The system can, in fact, receive multiple button selections from the user, with appropriate updates of the control for each button selection. Thus, as shown by dashed line 635, blocks 615 and 620 can be repeated as often as appropriate.

The following discussion is intended to provide a brief, general description of a suitable machine in which certain aspects of the invention may be implemented. Typically, the machine includes a system bus to which is attached processors, memory, e.g., random access memory (RAM), read-only memory (ROM), or other state preserving medium, storage devices, a video interface, and input/output interface ports. The machine may be controlled, at least in part, by input from conventional input devices, such as keyboards, mice, etc., as well as by directives received from another machine, interaction with a virtual reality (VR) environment, biometric feedback, or other input signal. As used herein, the term "machine" is intended to broadly encompass a single machine, or a system of communicatively coupled machines or devices operating together. Exemplary machines include computing devices such as personal computers, workstations, servers, portable computers, handheld devices, telephones, tablets, etc., as well as transportation devices, such as private or public transportation, e.g., automobiles, trains, cabs, etc.

The machine may include embedded controllers, such as programmable or non-programmable logic devices or arrays, Application Specific Integrated Circuits, embedded computers, smart cards, and the like. The machine may utilize one or more connections to one or more remote machines, such as through a network interface, modem, or other communicative coupling. Machines may be interconnected by way of a physical and/or logical network, such as an intranet, the Internet, local area networks, wide area networks, etc. One skilled in the art will appreciated that network communication may utilize various wired and/or wireless short range or long range carriers and protocols, including radio frequency (RF), satellite, microwave, Institute of Electrical and Electronics Engineers (IEEE) 810.11, Bluetooth, optical, infrared, cable, laser, etc.

The invention may be described by reference to or in conjunction with associated data including functions, procedures, data structures, application programs, etc. which when accessed by a machine results in the machine performing tasks or defining abstract data types or low-level hardware contexts. Associated data may be stored in, for example, the volatile and/or non-volatile memory, e.g., RAM, ROM, etc., or in other storage devices and their associated storage media, including hard-drives, floppy-disks, optical storage, tapes, flash memory, memory sticks, digital video disks, biological storage, etc. Associated data may be delivered over transmission environments, including the physical and/or logical network, in the form of packets, serial data, parallel data, propagated signals, etc., and may be used in a compressed or encrypted format. Associated data may be used in a distributed environment, and stored locally and/or remotely for machine access.

Having described and illustrated the principles of the invention with reference to illustrated embodiments, it will be recognized that the illustrated embodiments may be modified in arrangement and detail without departing from such principles. And, though the foregoing discussion has focused on particular embodiments, other configurations are contemplated. In particular, even though expressions such as "in one embodiment" or the like are used herein, these phrases are meant to generally reference embodiment possibilities, and are not intended to limit the invention to particular embodiment configurations. As used herein, these terms may reference the same or different embodiments that are combinable into other embodiments.

Embodiments of the invention can extend to the following statements, without limitation:

An embodiment of the invention includes a system, comprising: a computer, a processor in the computer, a memory in the computer, an Arbitrary Waveform Generator, and a control in the memory of the computer generated using the processor, the control including a plurality of buttons, a drop-down list, and a text box, presented to a user on a single screen, wherein upon a selection of one of the plurality of buttons by the user, the drop-down list and the text box are automatically updated in the single screen to reflect values appropriate for the selected button, and wherein the control is operative to interface with the Arbitrary Waveform Generator to generate waveforms responsive to information input to the control.

An embodiment of the invention includes a system, comprising: a computer, a processor in the computer, a memory in the computer, an Arbitrary Waveform Generator, and a control in the memory of the computer generated using the processor, the control including a plurality of buttons including four channel buttons, four channel marker buttons, a timing button, a trigger button, a run button, a DC button, a resampling button, a calibration button, a diagnostics button, a waveform sequence button, a force trigger button, a force event button, an on/off button, an event button, and a play button, a drop-down list, and a text box, presented to a user on a single screen, wherein upon a selection of one of the plurality of buttons by the user, the drop-down list and the text box are automatically updated in the single screen to reflect values appropriate for the selected button, and wherein the control is operative to interface with the Arbitrary Waveform Generator to generate waveforms responsive to information input to the control.

An embodiment of the invention includes a system, comprising: a computer, a processor in the computer, a memory in the computer, an Arbitrary Waveform Generator, and a control in the memory of the computer generated using the processor, the control including a plurality of buttons including four channel buttons, four channel marker buttons, a timing button, a trigger button, a run button, a DC button, a resampling button, a calibration button, a diagnostics button, a waveform sequence button, a force trigger button, a force event button, an on/off button, an event button, a play button, a waveform list button, and an import button, a drop-down list, and a text box, presented to a user on a single screen, wherein upon a selection of one of the plurality of buttons by the user, the drop-down list and the text box are automatically updated in the single screen to reflect values appropriate for the selected button, and wherein the control is operative to interface with the Arbitrary Waveform Generator to generate waveforms responsive to information input to the control.

An embodiment of the invention includes a system, comprising: a computer, a processor in the computer, a memory in the computer, an Arbitrary Waveform Generator, and a control in the memory of the computer generated using the processor, the control including a plurality of buttons including four channel buttons, four channel marker buttons, a timing button, a trigger button, a run button, a DC button, a resampling button, a calibration button, a diagnostics button, a waveform sequence button, a force trigger button, a force event button, an on/off button, an event button, and a play button, a drop-down list, and a text box, and a moveable button that can be used to select an item from the drop-down list if the drop-down list has focus or to change a value in the text box if the text box has focus, presented to a user on a single screen, wherein upon a selection of one of the plurality of buttons by the user, the drop-down list and the text box are automatically updated in the single screen to reflect values appropriate for the selected button, and wherein the control is operative to interface with the Arbitrary Waveform Generator to generate waveforms responsive to information input to the control.

An embodiment of the invention includes a system, comprising: a computer, a processor in the computer, a memory in the computer, an Arbitrary Waveform Generator, and a control in the memory of the computer generated using the processor, the control including a plurality of buttons including four channel buttons, four channel marker buttons, a timing button, a trigger button, a run button, a DC button, a resampling button, a calibration button, a diagnostics button, a waveform sequence button, a force trigger button, a force event button, an on/off button, an event button, and a play button, a drop-down list, and a text box, and a dot that can be used to select an item from the drop-down list if the drop-down list has focus or to change a value in the text box if the text box has focus, the dot moveable around the outer edge of the control, presented to a user on a single screen, wherein upon a selection of one of the plurality of buttons by the user, the drop-down list and the text box are automatically updated in the single screen to reflect values appropriate for the selected button, and wherein the control is operative to interface with the Arbitrary Waveform Generator to generate waveforms responsive to information input to the control.

An embodiment of the invention includes a system, comprising: a computer, a processor in the computer, a memory in the computer, an Arbitrary Waveform Generator, and a control in the memory of the computer generated using the processor, the control including a plurality of buttons including four channel buttons, four channel marker buttons, a timing button, a trigger button, a run button, a DC button, a resampling button, a calibration button, a diagnostics button, a waveform sequence button, a force trigger button, a force event button, an on/off button, an event button, and a play button, a drop-down list, and a text box, and an animated waveform graphic icon when the Arbitrary Waveform Generator is generating a waveform, presented to a user on a single screen, wherein upon a selection of one of the plurality of buttons by the user, the drop-down list and the text box are automatically updated in the single screen to reflect values appropriate for the selected button, and wherein the control is operative to interface with the Arbitrary Waveform Generator to generate waveforms responsive to information input to the control.

An embodiment of the invention includes a system, comprising: a computer, a processor in the computer, a memory in the computer, an Arbitrary Waveform Generator, and a control in the memory of the computer generated using the processor, the control including a plurality of buttons, a drop-down list, and a text box, presented to a user on a single screen, wherein upon a selection of one of the plurality of buttons by the user, the drop-down list and the text box are automatically updated in the single screen to reflect values appropriate for the selected button, and wherein the control is operative to interface with the Arbitrary Waveform Generator to generate waveforms responsive to information input to the control, and wherein the Arbitrary Waveform Generator includes the computer and the control.

An embodiment of the invention includes a system, comprising: a computer, a processor in the computer, a memory in the computer, an Arbitrary Waveform Generator, and a control in the memory of the computer generated using the processor, the control including a plurality of buttons, a drop-down list, and a text box, presented to a user on a single screen, wherein upon a selection of one of the plurality of buttons by the user, the drop-down list and the text box are automatically updated in the single screen to reflect values appropriate for the selected button, and wherein the control is operative to interface with the Arbitrary Waveform Generator to generate waveforms responsive to information input to the control, and wherein the Arbitrary Waveform Generator is connected to the computer including the control.

An embodiment of the invention includes a method, comprising: receiving from a user a request to display a control for an Arbitrary Waveform Generator, displaying the control to the user, the control including a plurality of buttons, a drop-down list, and a text box, the control presented using a single screen, receiving from the user a selection of a button on the control, and responsive to the selection of the button, automatically updating the drop-down list and the text box in the single screen appropriate to the selected button, wherein the control is operative to interface with the Arbitrary Waveform Generator to generate waveforms responsive to information input to the control.

An embodiment of the invention includes a method, comprising: receiving from a user a request to display a control for an Arbitrary Waveform Generator at the Arbitrary Waveform Generator, displaying the control to the user, the control including a plurality of buttons, a drop-down list, and a text box, the control presented using a single screen, receiving from the user a selection of a button on the control, and responsive to the selection of the button, automatically updating the drop-down list and the text box in the single screen appropriate to the selected button, wherein the control is operative to interface with the Arbitrary Waveform Generator to generate waveforms responsive to information input to the control.

An embodiment of the invention includes a method, comprising: receiving from a user a request to display a control for an Arbitrary Waveform Generator at a machine connected to the Arbitrary Waveform Generator, displaying the control to the user, the control including a plurality of buttons, a drop-down list, and a text box, the control presented using a single screen, receiving from the user a selection of a button on the control, and responsive to the selection of the button, automatically updating the drop-down list and the text box in the single screen appropriate to the selected button, wherein the control is operative to interface with the Arbitrary Waveform Generator to generate waveforms responsive to information input to the control.

An embodiment of the invention includes a method, comprising: receiving from a user a request to display a control for an Arbitrary Waveform Generator, displaying the control to the user, the control including a plurality of buttons including four channel buttons, four channel marker buttons, a timing button, a trigger button, a run button, a DC button, a resampling button, a calibration button, a diagnostics button, a waveform sequence button, a force trigger button, a force event button, an on/off button, an event button, and a play button, a drop-down list, and a text box, the control presented using a single screen, receiving from the user a selection of a button on the control, and responsive to the selection of the button, automatically updating the drop-down list and the text box in the single screen appropriate to the selected button, wherein the control is operative to interface with the Arbitrary Waveform Generator to generate waveforms responsive to information input to the control.

An embodiment of the invention includes a method, comprising: receiving from a user a request to display a control for an Arbitrary Waveform Generator, displaying the control to the user, the control including a plurality of buttons including four channel buttons, four channel marker buttons, a timing button, a trigger button, a run button, a DC button, a resampling button, a calibration button, a diagnostics button, a waveform sequence button, a force trigger button, a force event button, an on/off button, an event button, a play button, a waveform list button, and an import button, a drop-down list, and a text box, the control presented using a single screen, receiving from the user a selection of a button on the control, and responsive to the selection of the button, automatically updating the drop-down list and the text box in the single screen appropriate to the selected button, wherein the control is operative to interface with the Arbitrary Waveform Generator to generate waveforms responsive to information input to the control.

An embodiment of the invention includes a method, comprising: receiving from a user a request to display a control for an Arbitrary Waveform Generator, displaying the control to the user, the control including a plurality of buttons including four channel buttons, four channel marker buttons, a timing button, a trigger button, a run button, a DC button, a resampling button, a calibration button, a diagnostics button, a waveform sequence button, a force trigger button, a force event button, an on/off button, an event button, and a play button, a drop-down list, a text box, and a moveable button that can be used to select an item from the drop-down list if the drop-down list has focus or to change a value in the text box if the text box has focus, the control presented using a single screen, receiving from the user a selection of a button on the control, and responsive to the selection of the button, automatically updating the drop-down list and the text box in the single screen appropriate to the selected button, wherein the control is operative to interface with the Arbitrary Waveform Generator to generate waveforms responsive to information input to the control.

An embodiment of the invention includes a method, comprising: receiving from a user a request to display a control for an Arbitrary Waveform Generator, displaying the control to the user, the control including a plurality of buttons including four channel buttons, four channel marker buttons, a timing button, a trigger button, a run button, a DC button, a resampling button, a calibration button, a diagnostics button, a waveform sequence button, a force trigger button, a force event button, an on/off button, an event button, and a play button, a drop-down list, a text box, and a dot on an outer edge of the control, the dot moveable around the outer edge of the control, that can be used to select an item from the drop-down list if the drop-down list has focus or to change a value in the text box if the text box has focus, the control presented using a single screen, receiving from the user a selection of a button on the control, and responsive to the selection of the button, automatically updating the drop-down list and the text box in the single screen appropriate to the selected button, wherein the control is operative to interface with the Arbitrary Waveform Generator to generate waveforms responsive to information input to the control.

An embodiment of the invention includes a method, comprising: receiving from a user a request to display a control for an Arbitrary Waveform Generator, displaying the control to the user, the control including a plurality of buttons including four channel buttons, four channel marker buttons, a timing button, a trigger button, a run button, a DC button, a resampling button, a calibration button, a diagnostics button, a waveform sequence button, a force trigger button, a force event button, an on/off button, an event button, and a play button, a drop-down list, a text box, and an animated waveform graphic icon when the Arbitrary Waveform Generator is generating a waveform, the control presented using a single screen, receiving from the user a selection of a button on the control, and responsive to the selection of the button, automatically updating the drop-down list and the text box in the single screen appropriate to the selected button, wherein the control is operative to interface with the Arbitrary Waveform Generator to generate waveforms responsive to information input to the control.

An embodiment of the invention includes a method, comprising: receiving from a user a request to display a control for an Arbitrary Waveform Generator, displaying the control to the user, the control including a plurality of buttons, a drop-down list, and a text box, the control presented using a single screen, receiving from the user a selection of a button on the control, responsive to the selection of the button, automatically updating the drop-down list and the text box in the single screen appropriate to the selected button, receiving from the user a selection of a play button, and sending instructions to the Arbitrary Waveform Generator to generate a waveform according to settings provided by the user, wherein the control is operative to interface with the Arbitrary Waveform Generator to generate waveforms responsive to information input to the control.

Consequently, in view of the wide variety of permutations to the embodiments described herein, this detailed description and accompanying material is intended to be illustrative only, and should not be taken as limiting the scope of the invention. What is claimed as the invention, therefore, is all such modifications as may come within the scope and spirit of the following claims and equivalents thereto.

The invention claimed is:

1. A system, comprising:
   a computer;
   a processor in the computer;
   a memory in the computer;
   an Arbitrary Waveform Generator; and
   a control in the memory of the computer generated using the processor, the control including a plurality of buttons, a drop-down list, and a text box, presented to a user on a single screen,
   wherein upon a selection of one of said plurality of buttons by said user, said drop-down list and said text box are automatically updated in the single screen to reflect values appropriate for said selected button, and
   wherein the control is operative to interface with the Arbitrary Waveform Generator to generate waveforms responsive to information input to the control.

2. A system according to claim 1, wherein said plurality of buttons includes four channel buttons, four channel marker buttons, a timing button, a trigger button, a run button, a DC button, a resampling button, a calibration button, a diagnostics button, a waveform sequence button, a force trigger button, a force event button, an on/off button, an event button, and a play button.

3. A system according to claim 2, wherein said plurality of buttons further includes a waveform list button and an import button.

4. A system according to claim 2, wherein the control further includes a moveable button that can be used to select an item from said drop-down list if said drop-down list has focus or to change a value in said text box if said text box has focus.

5. A system according to claim 4, wherein said moveable button includes a dot on an outer edge of the control, said dot moveable around said outer edge of the control.

6. A system according to claim 2, wherein the control further includes an animated waveform graphic icon when the Arbitrary Waveform Generator is generating a waveform.

7. A system according to claim 1, wherein the Arbitrary Waveform Generator includes the computer and the control.

8. A system according to claim 1, wherein the Arbitrary Waveform Generator is connected to the computer including the control.

9. A method, comprising:
   receiving from a user a request to display a control for an Arbitrary Waveform Generator;
   displaying the control to the user, the control including a plurality of buttons, a drop-down list, and a text box, the control presented using a single screen;
   receiving from the user a selection of a button on the control; and
   responsive to the selection of the button, automatically updating the drop-down list and the text box in the single screen appropriate to the selected button,
   wherein the control is operative to interface with the Arbitrary Waveform Generator to generate waveforms responsive to information input to the control.

10. A method according to claim 9, wherein displaying the control includes displaying the control, the plurality of buttons including four channel buttons, four channel marker buttons, a timing button, a trigger button, a run button, a DC button, a resampling button, a calibration button, a diagnostics button, a waveform sequence button, a force trigger button, a force event button, an on/off button, an event button, and a play button.

11. A method according to claim 10, wherein displaying the control includes displaying the control, the plurality of buttons further includes a waveform list button and an import button.

12. A method according to claim 10, wherein displaying the control includes displaying the control, the control further includes a moveable button that can be used to select an item from the drop-down list if the drop-down list has focus or to change a value in the text box if the text box has focus.

13. A method according to claim 12, wherein displaying the control includes displaying the control, the moveable button includes a dot on an outer edge of the control, the dot moveable around the outer edge of the control.

14. A method according to claim 10, wherein displaying the control includes displaying the control, the control further includes an animated waveform graphic icon when the Arbitrary Waveform Generator is generating a waveform.

15. A method according to claim 9, further comprising:
   receiving from the user a selection of a play button; and
   sending instructions to the Arbitrary Waveform Generator to generate a waveform according to settings provided by the user.

* * * * *